(12) United States Patent
Itai

(10) Patent No.: US 8,371,352 B2
(45) Date of Patent: Feb. 12, 2013

(54) RADIAL TIRE FOR USE IN AIRCRAFT AND METHOD OF PRODUCING THE SAME

(75) Inventor: Seiji Itai, Tachikawa (JP)

(73) Assignee: Bridgestone Corporation, Tokyo (JP)

(*) Notice: Subject to any disclaimer, the term of this patent is extended or adjusted under 35 U.S.C. 154(b) by 816 days.

(21) Appl. No.: 12/443,397

(22) PCT Filed: Sep. 4, 2007

(86) PCT No.: PCT/JP2007/067218
§ 371 (c)(1),
(2), (4) Date: Mar. 27, 2009

(87) PCT Pub. No.: WO2008/041440
PCT Pub. Date: Apr. 10, 2008

(65) Prior Publication Data
US 2010/0084070 A1    Apr. 8, 2010

(30) Foreign Application Priority Data

Sep. 29, 2006    (JP) .................................. 2006-268732

(51) Int. Cl.
*B60C 9/22*    (2006.01)
(52) U.S. Cl. ......... 152/531; 152/526; 152/533; 152/538
(58) Field of Classification Search .................. 152/526, 152/531, 533, 535, 538; 156/117, 123
See application file for complete search history.

(56) References Cited

U.S. PATENT DOCUMENTS 3,991,803 A    11/1976    Praszek
4,484,965 A  * 11/1984    Wagner et al. ................ 156/117

(Continued)

FOREIGN PATENT DOCUMENTS

EP    0 479 065 A2    4/1992
EP    1 806 242 A1    7/2007

(Continued)

OTHER PUBLICATIONS

English machine translation of Masanori (JP2002-192908). Jul. 2002.*

(Continued)

*Primary Examiner* — Justin Fischer
*Assistant Examiner* — Robert Dye
(74) *Attorney, Agent, or Firm* — Sughrue Mion, PLLC

(57) ABSTRACT

The present invention provides a belt formed of a spirally wound strip member constituted of a few juxtaposed cords and rubber coating thereon, with a structure which can absorb influence of difference in winding diameter at the unit width portion of the strip member without deteriorating productivity of the tire. Specifically, the present invention provides a radial tire for use in aircraft, having a carcass including at least one layer of carcass ply extending in a troidal shape between a pair of bead cores, at least two layers of belt formed by spirally winding in a tire circumferential direction a strip member constituted of plural juxtaposed cords and rubber coating thereon, on the carcass on the outer side in the tire radial direction at a crown region of the carcass, and a tread rubber laminated on the belt, characterized in that: thickness and circumference of the belt decrease from the tire equatorial face toward end portions thereof in the widthwise direction; at least a belt portion corresponding to a tire shoulder portion, a boundary face between the belt layers and the tread rubber has a stepped configuration descending in the tire radial direction from the tire equatorial face toward the end portions thereof in the widthwise direction; and a boundary face between the belt and the carcass is a smooth curved face.

5 Claims, 3 Drawing Sheets

U.S. PATENT DOCUMENTS

| | | |
|---|---|---|
| 5,115,853 A | 5/1992 | Oare et al. |
| 5,178,703 A * | 1/1993 | Onoda et al. ............... 152/533 |
| 5,213,642 A * | 5/1993 | Sponagel ..................... 152/455 |
| 5,922,154 A | 7/1999 | Lowenhaupt et al. |
| 2005/0145314 A1 * | 7/2005 | Ikeda et al. ................. 152/458 |
| 2005/0194081 A1 * | 9/2005 | Yano et al. ................... 152/527 |

FOREIGN PATENT DOCUMENTS

| | | | |
|---|---|---|---|
| JP | 60-219103 | * | 11/1985 |
| JP | 63-103706 A | | 5/1988 |
| JP | 03-007008 U | | 1/1991 |
| JP | 05-162509 | * | 6/1993 |
| JP | 06-234304 A | | 8/1994 |
| JP | 09-030211 A | | 2/1997 |
| JP | 2002-192908 A | | 7/2002 |
| JP | 2005-193896 A | | 7/2005 |
| WO | 03/061991 A1 | | 7/2003 |

OTHER PUBLICATIONS

Supplementary European Search Report issued in European Application No. 07806673.5-2425/2067635 dated Aug. 3, 2010 (6 pages).

Japanese Office Action issued in Application No. 2006-268732 dated Mar. 21, 2012.

Japanese Office Action issued in Application No. 2006-268732 dated Jun. 19, 2012.

* cited by examiner

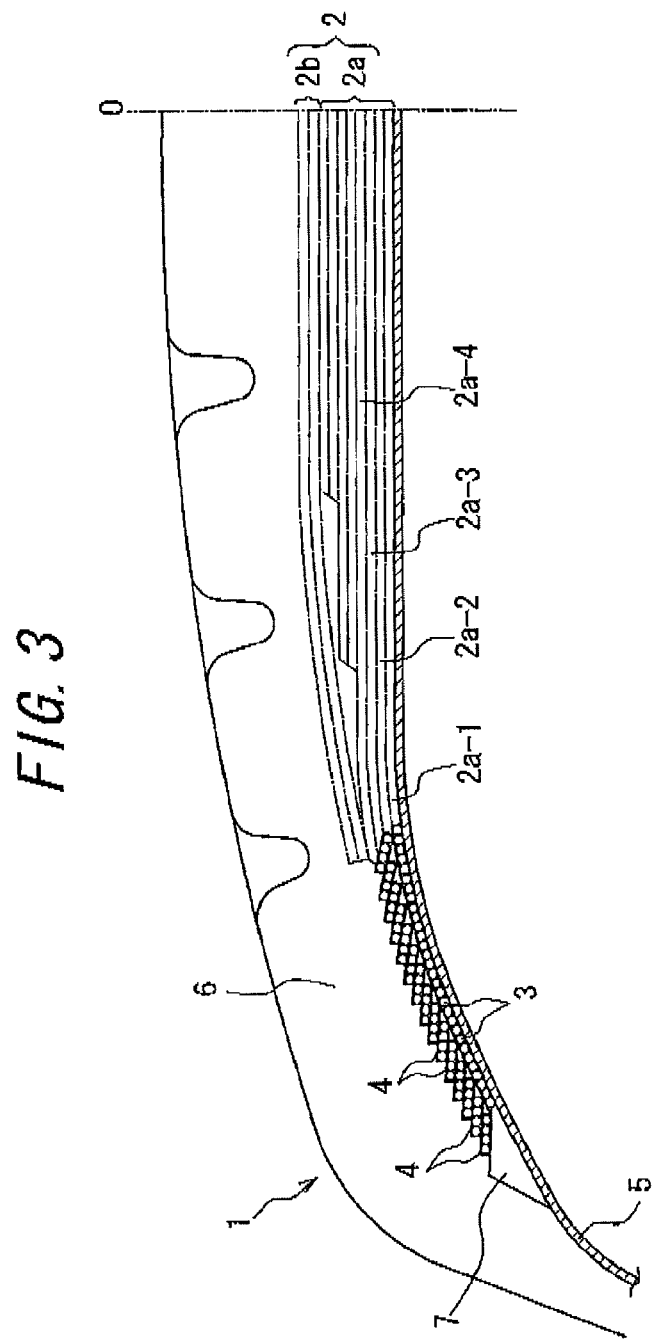

RADIAL TIRE FOR USE IN AIRCRAFT AND METHOD OF PRODUCING THE SAME

TECHNICAL FIELD

The present invention relates to a radial tire for use in aircraft, and in particular, to a tire for use in aircraft having improved belt durability.

PRIOR ART

Performances required in a radial tire for use in aircraft include durability against cutting by an exterior substance. Specifically, since an aircraft tire is used under a harsh environment, in a case in which an aircraft tire suffers from cut damage by stepping an exterior material, it is likely that tread peeling started from this damage (what is called "peel-off") occurs, which may result in tire burst. If tire fractures generated as a result of such peel-off and/or tire burst cause a damage to an aircraft itself, there could arise quite a big problem. Therefore, improving cut-resistant durability has been a very important task in a tire for use in aircraft.

Here, design elements contributing to improving cut-resistance durability include suppressing tire expansion in the radial direction when a tire is inflated. If this tire expansion in the tire radial direction can be suppressed, cut-resistance durability will improve. Further, for the purpose of reducing fuel emission from aircrafts, it has been an essential thesis for aircraft manufactures to reduce aircraft weight to an ultimate manner in recent years. A demand to reduce tire weight with respect to tire manufactures has been escalated, accordingly.

It is increasingly difficult to satisfy the demand as described above by tires developed on the basis of the conventional types. Examples of tires based on the new technology include an aircraft tire proposed in JP 2005-193896, in which durability is improved by spirally winding in a tire circumferential direction a strip member constituted of a few juxtaposed cords and rubber coating thereon on a belt portion (a belt portion corresponding to a tire shoulder portion, in particular) in an overlapping manner. However, in this case, there arises a problem that, while radial expansion at the tire shoulder portions is relatively small, radial expansion at the tire center portion cannot be sufficiently suppressed.

Further, as a technology to realize suppression of tire expansion in the radial direction when a relatively small number of belts are used, WO2003/061991 discloses reducing weight of a tire shoulder portion by employing what is called a convex structure in which the number of layers at a belt portion corresponding to the shoulder portion has been reduced, while the number of belt layers which is sufficient for suppressing tire expansion in the radial direction is maintained.

DISCLOSURE OF THE INVENTION

Problems to be solved by the Invention

In the convex structure described above, however, since the number of belt layers on the side of the shoulder portion is smaller than the number of belt layers at the center portion in the widthwise direction of the tire and the belt at the shoulder portion is extended more than the center portion does, a ground contact configuration in which the ground contact length at the shoulder portion is longer than the ground contact length at the center portion (i.e. a butterfly-like configuration) is resulted. Therefore, in order to avoid having this butterfly-like ground contact configuration, it is necessary to make the curvature radius at the crown region of a tread smaller than the conventional structure so that the ground contact length at the shoulder portion is shortened (this modified configuration will be referred to as "R configuration" hereinafter).

In the tire having "R configuration" described above, the shape of the belt thereof also inevitably has "R configuration", i.e. is not in a substantially flat shape, in order to allow the tread to have contact with the ground in an appropriate manner. Due to this, in building a tire of this type by continually winding the above-described strip member on the crown region of a carcass ply on the drum, the winding diameter of the strip member is larger at the outer side (the shoulder portion side) region than at the inner side (the center portion side of the belt in the widthwise direction), whereby a phenomenon occurs in which the winding of the strip member at the outer side region loosens.

In FIG. 1(a), a section of a belt 2 of an aircraft tire 1 in the tire widthwise direction is shown. In general, the belt 2 is constituted of plural (eight in the drawing) circumferential direction belt layers 2a and plural (two in the drawing) intersecting belt layers 2b laminated on the outer side in the radial direction of the circumferential direction belt layers 2a. The circumferential direction belt layers 2a of the belt 2 are formed by, for example, spirally winding a strip member 4 constituted of four juxtaposed cords 3 and rubber coating provided thereon on the crown region of a carcass ply (not shown) such that the wound strips 4 abut each other in the tire widthwise direction. The strip member 4 is wound continually in the widthwise direction of the belt. As shown in FIG. 1(a), in the shoulder regions, in particular, there arises difference in winding diameter between the inner side region on the equatorial face O side and the outer side region on the belt end portion side of the tire, even within the width of one winding (which width will be referred to as "unit width" hereinafter) of the strip member 4. Therefore, if the spiral winding is carried out under a constant tension applied thereto, it is difficult to keep the tension of the wound strips constant and unanimous thereafter. That is, it is difficult to prevent the wound portion in the outer side region of the strip member 4 from loosening.

In a case in which the wound portion of the strip member 4 in the widthwise outer side region of the belt is loosened, for example, in the unit width portion of the strip member 4 at the belt end portions in the widthwise direction (see the arrow (b) in FIG. 1(a)), the cords 3 in the outer side region of the unit width portion are deformed in a wavy manner as shown in FIG. 1(b). Abnormal distortion is generated at this wavy-deformed portion of the cord during running of the tire. In particular, in a case in which a wavy deformation is made at the belt end portion where belt is already significantly deformed, separation occurs with the belt end deformed portion as the starting point, which deteriorates durability of the belt.

If a single cord were to be wound around the carcass to form a belt layer, the belt layer would be able to follow any "R configuration". However, this method would significantly deteriorate productivity.

In view of this, an object of the present invention is to provide a belt formed of a spirally wound strip member constituted of a few juxtaposed cords and rubber coating thereon, with a structure which can absorb influence of difference in winding diameter at the unit width portion of the strip member without deteriorating productivity of the tire.

Means for Solving the Problem

The gist of the structure of the present invention is as follows.

(1) A radial tire for use in aircraft, having a carcass including at least one layer of carcass ply extending in a troidal shape between a pair of bead cores, at least two layers of belt formed by spirally winding in a tire circumferential direction a strip member constituted of plural juxtaposed cords and rubber coating thereon, on the carcass on the outer side in the tire radial direction at a crown region of the carcass, and a tread rubber laminated on the belt, characterized in that: thickness and circumference of the belt decrease from the tire equatorial face toward end portions thereof in the widthwise direction; at least a belt portion corresponding to a tire shoulder portion, a boundary face between the belt layers and the tread rubber has a stepped configuration descending in the tire radial direction from the tire equatorial face toward the end portions thereof in the widthwise direction; and a boundary face between the belt and the carcass is a smooth, curved face.

(2) The radial tire for use in aircraft of claim 1, wherein in the stepped configuration the width of each step is in a range of 0.2 to 0.6 times as wide as the width of the strip member.

(3) The radial tire for use in aircraft of claim 1 or 2, wherein the cord has physical characteristics including: tensile strength being 6.3 cN·dtex or more; elongation rate under a load of 0.3 cN/dtex being in a range of 0.2 to 2.0%; elongation rate under a load of 2.1 cN/dtex being in a range of 1.5 to 7.0%; elongation rate under a load of 3.2 cN/dtex being in a range of 2.2 to 9.3%.

(4) The radial tire for use in aircraft of any of claims 1 to 3, wherein the cord is formed of aromatic polyamide fibers.

(5) The radial tire for use in aircraft of any of claims 1 to 4, wherein a rubber member having a triangular section is provided at the end portions of the belt.

(6) A method of producing a radial tire for use in aircraft, the method including preparing a carcass constituted of at least one layer of carcass ply extending in a troidal shape between a pair of bead cores and forming at least two layers of belt by spirally winding in a tire circumferential direction a strip member constituted of plural juxtaposed cords and rubber coating thereon, on the carcass on the outer side in the tire radial direction at a crown region of the carcass, characterized in that: the method further comprising, with regard to formation of at least a belt portion corresponding to a tire shoulder portion: forming the tire radial direction innermost belt layer by spirally winding the strip member such that respective turns of the wound strip member abut each other in the widthwise direction; and forming the tire radial direction outermost belt layer by spirally winding the strip member with a winding pitch smaller than the width of the strip member.

(7) The method of producing a radial tire for use in aircraft of claim 6, further comprising forming the tire radial direction outermost belt layer by spirally winding the strip member at a winding pitch 0.2 to 0.6 times as wide as the width of the strip member.

(8) The method of producing a radial tire for use in aircraft of claim 6 or 7, further comprising spirally winding the strip member from a rubber member having a triangular section as a starting point.

Effect of the Invention

According to the present invention, in a belt formed by spirally winding a strip member constituted of a few juxtaposed cords and rubber coating provided thereon, difference in winding diameter at the unit width portion of a strip member is reduced and separation due to the difference in radial dimension is prevented from occurring, whereby durability of the belt is improved.

BRIEF EXPLANATION OF THE DRAWINGS

FIG. 3 is a drawing showing another belt structure of the present invention.

EXPLANATION OF REFERENCE NUMERALS

1 Tire
2 Belt
2a Circumferential Direction Belt Layers
2b Intersecting Belt Layer
3 Cord
4 Strip Member
5 Carcass
6 Tread Rubber
7 Rubber Material

BEST MODE FOR CARRYING OUT THE INVENTION

Hereinafter, the tire for use in aircraft of the present invention will be described in detail with reference to the drawings.

Figure 1:
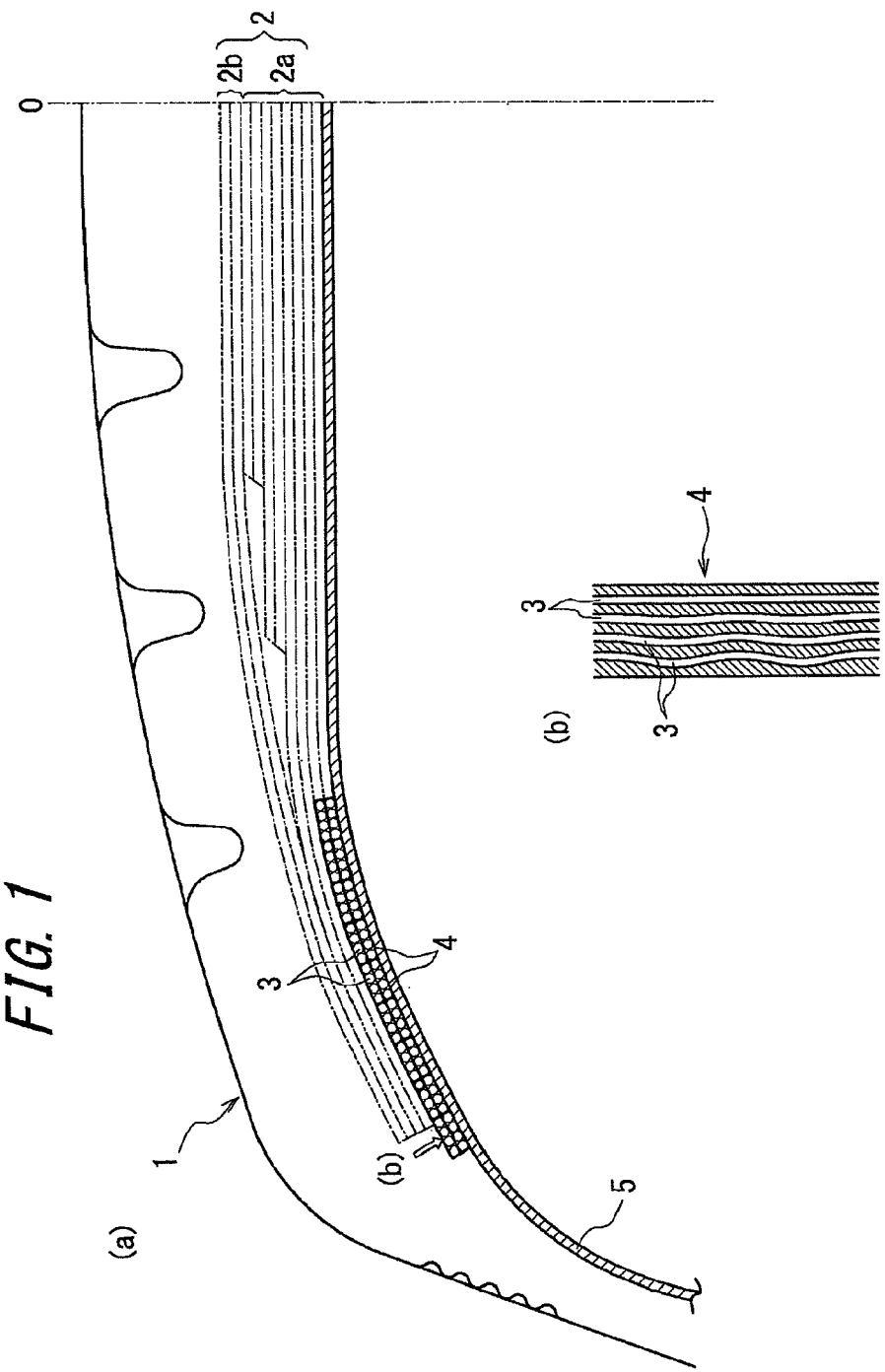
FIG. 1 is a drawing showing a conventional belt structure.
Figure 2:
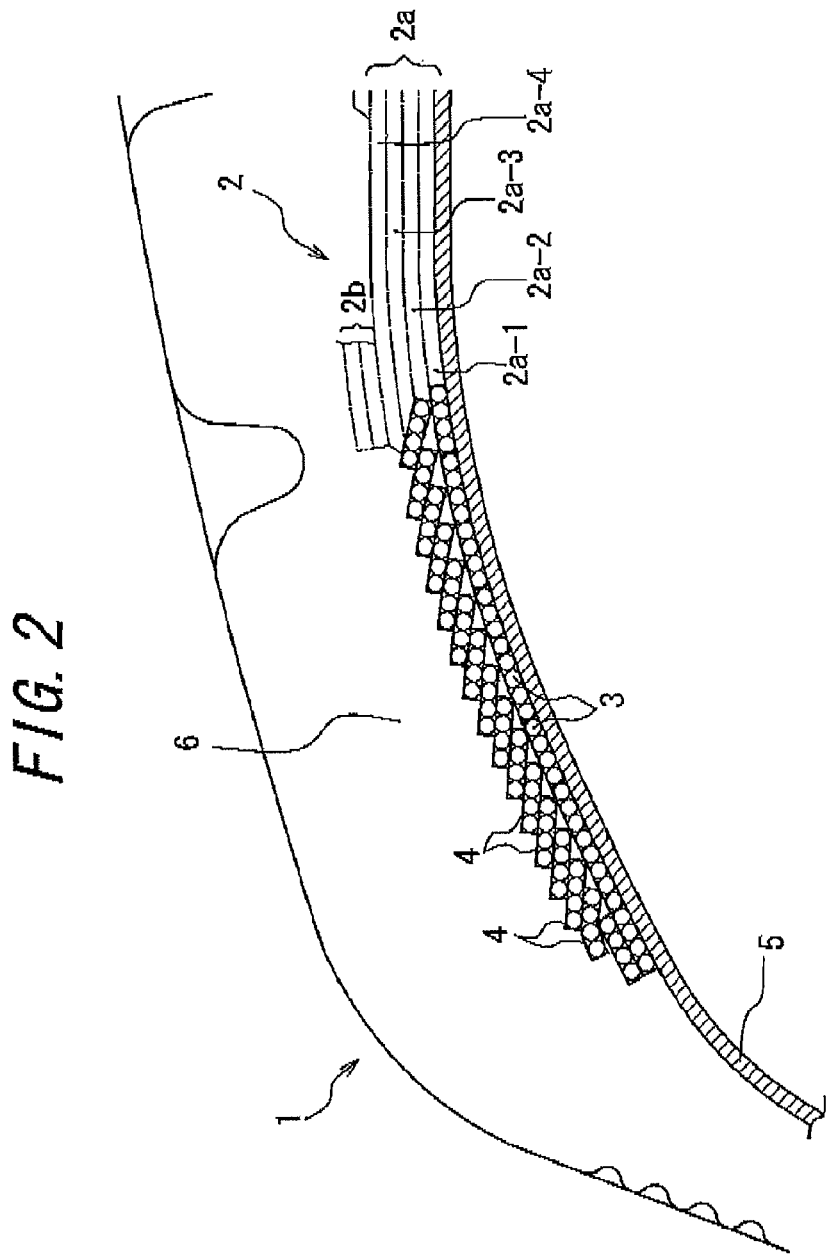
FIG. 2 is a drawing showing a belt structure of the present invention.

FIG. 2 shows a belt structure in which, on the outer side in the tire radial direction of a circumferential direction belt layers 2a, intersecting belt layers 2b generally having narrower widths than the circumferential direction belt layers 2a are disposed in a laminating manner as in the belt 2 of the aircraft tire 1 shown in FIG. 1. FIG. 2 shows an example in which the present invention is applied to the circumferential direction belt layers 2a. Specifically, as shown in FIG. 2, among the circumferential direction belt layers 2a, the circumferential direction belt layer 2a-1 on the tire radial direction innermost side is formed by spirally winding a strip member 4, constituted of, for example, four juxtaposed cords 3 and rubber coating provided thereon, such that respective turns of the wound strip member abut each other in the widthwise direction. The circumferential direction belt layer 2a-1 thus formed has a boundary face with the carcass 5 on the radial direction inner side, which boundary face exhibits a smooth, curved face.

Next, the circumferential direction belt layers 2a-2, 2a-3 and 2a-4 to be laminated on the radial direction outer side of the circumferential direction belt layer 2a-1 are formed, as shown in FIG. 2, by spirally winding the strip member 4 with a winding pitch smaller than the width of the strip member 4, i.e. spirally winding the strip member 4 such that respective turns of the would strip member 4 partially overlap with each other. In the circumferential direction belt layers 2a-2, 2a-3 and 2a-4 thus formed, in at least a shoulder portion thereof, the boundary face between the circumferential direction belt layers 2a-2, 2a-3 and 2a-4 and the tread rubber 6 has a stepped configuration descending in the tire radial direction from the tire equatorial face O toward the end portions in the belt widthwise direction. In the present invention, a "shoulder" portion represents each region on the outer side in the belt widthwise direction of the region defined as having 60% of the belt overall width with the center thereof being the equatorial face O.

It should be noted that the circumferential direction belt layers 2a-2, 2a-3 and 2a-4 can have the belt structure similar to that described above in the regions other than the shoulder portions thereof. In that case, the boundary face between the circumferential direction belt layers 2a-2, 2a-3 and 2a-4 and the intersecting belt layers 2b has a stepped configuration. Alternatively, the circumferential direction belt layers 2a-2, 2a-3 and 2a-4 can have the conventional belt structure similar to that of the circumferential direction belt layer 2a-1.

In the circumferential direction belt layer 2a having the structure as described above, in the shoulder portions thereof, in particular, the boundary face between the circumferential direction belt layers 2a and the tread rubber 6 has a stepped configuration descending in the tire radial direction from the tire equatorial face O toward the end portions in the belt widthwise direction. As a result, the difference in circumference between the inner side and the outer side in the widthwise direction of the strip member is made relatively small, whereby wavy deformation of cords in the outer side can be suppressed and thus distortion around the cords can be suppressed, improving durability of the belt.

On the other hand, the interface between the circumferential direction belt layer 2a and the carcass 5 exhibits a smooth, curved face. Accordingly, adhesion of the belt to the carcass in the tire building process is improved and production failure due to trapped air can be reduced.

The circumferential direction belt layer 2a described above is formed by spirally wining the strip member 4 with a winding pitch smaller than the width of the strip member 4, i.e. such that respective turns of the wound strip member 4 partially overlap each other. Therefore, the difference in winding diameter, between the inner side region on the tire equatorial face O side and the outer side region on the belt end portion side of the tire within the unit width of the strip member 4, can be made extremely small. As a result, wavy deformation of cords as shown in FIG. 1(b), which locally occurs within the unit width of the strip member 4, is suppressed, improving durability of the belt.

In the circumferential direction belt layers 2a, the circumferential direction belt layer 2a-1 on the innermost side in the radial direction has the conventional structure in which the strip member 4 is spirally wound such that respective turns of the wound strip member 4 abut each other in the widthwise direction. Since the circumferential direction belt layer on the innermost side in the radial direction is less likely to be affected by shearing strain than the circumferential direction belt layers 2a-2, 2a-3 and 2a-4 on the outer side in the radial direction, it is not essential that the innermost belt layer has the spiral winding structure in which respective turns of the strip member partially overlap each other. In view of the workability when the circumferential direction belt layers 2a-2, 2a-3 and 2a-4 are formed by spirally winding the strip member 4 on the circumferential direction belt layer 2a-1 with a relatively small pitch, it is rather preferable that the circumferential direction belt layer 2a-1 is a belt layer formed, by the conventional winding, to have a smooth surface.

Each of the circumferential direction belt layers 2a is formed by spirally winding the strip member 4 at a winding angle of substantially 0°, specifically in a range of 0-3°, with respect to the tire equatorial face O in a continuous manner from the start to the end of winding. The belt 2 has a convex structure in which layer thickness thereof is gradually decreased from the tire equatorial face O toward the belt end portions. The belt 2 has "R configuration" at the shoulder portions thereof, in which configuration the winding diameter of the belt layer is gradually decreased.

The strip member 4 is a ribbon-shaped treating material constituted of plural, specifically 2 to 10 juxtaposed cords and rubber coating provided thereon. Specifically, the number of cords of the strip member 4 is set in a range of two to ten because constituting the strip member 4 of a single cord significantly deteriorates productivity, while constituting the strip member 4 of eleven or more cords makes it difficult to obtain an effect of suppressing difference in winding diameter due to change in winding pitch.

In the present embodiment, it is preferable that in the shoulder portions, given that the unit width of the strip member 4 is expressed as 1, the winding pitch in building the circumferential direction belt layer is smaller than 1 pitch, specifically a pitch 0.2 to 0.6 times as wide as the unit width (FIG. 2 shows an example of 0.5 pitch). Generally, 1 pitch is employed. However, by employing a relatively small pitch, the strength of the belt layer can be increased. Further, with a relatively small pitch, by winding the strip member 4 in a stepped configuration in accordance with the "R configuration" which the belt should have, difference in winding diameter within the unit width of the strip member 4 can be suppressed, whereby the cords are prevent from being loosened.

In a case in which the pitch is smaller than 0.2 times as wide as the unit width, the belt is reinforced beyond necessity, increasing the belt weight. On the other hand, in a case in which the pitch is larger than 0.6 times as wide as the unit width, an effect of suppressing difference in winding diameter within the unit width of the strip member 4 cannot be obtained in a satisfactory manner. In view of these facts, the winding pitch is set in a range of 0.2-0.6 times as wide as the unit width.

Suitable examples of a reinforcing element for the strip member 4 include a cord formed of aromatic polyamide fiber having characteristics including: tensile strength being 6.3 cN·dtex or more; elongation rate under a load of 0.3 cN/dtex being in a range of 0.2 to 2.0%; elongation rate under a load of 2.1 cN/dtex being in a range of 1.5 to 7.0%; elongation rate under a load of 3.2 cN/dtex being in a range of 2.2 to 9.3%. More specifically, when tensile strength of a cord is smaller than 6.3 cN·dtex, the cord presumably has the elongation rate of an aramid cord. In other words, a cord having tensile strength of 6.3 cN·dtex or more is not an aramid cord.

In building the circumferential direction belt layer 2a, when the strip member 4 is wound with a relatively small pitch on the outer side in the radial direction of the circumferential direction belt layer 2a-1, by making a rubber member 7 having a triangular section function as a wedge and winding the strip member 4 from the rubber material 7 as the starting point as shown in FIG. 3, the overlapping portions of the strip member 4, in particular, in the belt end portions thereof, can be disposed in parallel with each other, whereby the spiral winding conditions at a relatively small pitch can be further improved and the difference in winding diameter within one unit width of the strip member 4 can be further suppressed.

Examples

Aircraft tires having the belt structure as shown in FIGS. 1 to 3 and size of 1400×530 R23 40PR were prepared under the conditions as shown in Table 1. The intersecting belt layers were formed as a belt of two layers intersecting each other at an angle of approximately 20° by winding the strip member, which was coated nylon cords. The specimen tires thus obtained were evaluated with regard to: presence/absence of wavy deformation in a cord within one unit width of the strip member in the second layer of the belt layer 2a end portions; and belt durability.

Specifically, presence/absence of wavy deformation in a cord was determined by first peeling off the upper layers of the tire up to the belt layers 2b and visually observing the end portions of the belt layer 2a to check the shape and state of the cords.

Further, the belt durability was evaluated by: mounting each of the specimen tires to a standard rim after adjusting the pneumatic pressure of the tire to the standard pneumatic pressure; subjecting the mounted tire to a drum running test under the standard load and the standard speed, in which test running for approximately 1 minute and subsequent stopping for approximately 30 minutes constituted one cycle and this cycle was repeated until a failure or abnormal expansion of a tread occurred at the shoulder portion of the tire. The belt durability was evaluated by the number of the repetition of the cycle. The evaluation results were expressed by an index in which the number of the repetition of the cycle in the conventional tire was 100.

These evaluation results are shown in Table 1.

TABLE 1

|  | Examples 1 tire | Examples 2 tire | Examples 3 tire | Examples 4 tire | Examples 5 tire | Conventional Example |
| --- | --- | --- | --- | --- | --- | --- |
| Belt structure | FIG. 2 Convex | FIG. 2 Convex | FIG. 2 Convex | FIG. 2 Convex | FIG. 3 Convex | FIG. 1 Convex |
| Circumferential direction belt layer cord | Aromatic polyamide | Aromatic polyamide | Aromatic polyamide | Aromatic polyamide | Aromatic polyamide | Aromatic polyamide |
| Belt forming method | Spiral winding | Spiral winding | Spiral winding | Spiral winding | Spiral winding | Spiral winding |
| Belt end portion side circumference/Center circumference | 0.9 | 0.9 | 0.9 | 0.9 | 0.9 | 0.9 |
| Number of cords in the strip member | 4 | 4 | 4 | 9 | 4 | 4 |
| Spiral winding pitch | 0.5 | 0.3 | 0.6 | 0.2 | 0.5 | 1 |
| Presence/absence of wavy deformation | Absent | Absent | Absent | Absent | Absent | Present |
| Drum durability | 110 | 108 | 103 | 105 | 115 | 100 |

The invention claimed is:

1. An aircraft radial tire, having a carcass including at least one layer of carcass ply extending in a toroidal shape between a pair of bead cores, at least two layers of circumferential belt formed by spirally winding in a tire circumferential direction a strip member constituted of plural juxtaposed cords and rubber coating thereon, on the carcass on the outer side in the tire radial direction at a crown region of the carcass, and a tread rubber laminated on the circumferential belt, characterized in that:

thickness and circumference of the circumferential belt decrease from the tire equatorial face toward end portions thereof in the widthwise direction; at at least a belt portion corresponding to a tire shoulder portion, a boundary face between the circumferential belt layers and the tread rubber has a stepped configuration descending in the tire radial direction from the tire equatorial face toward the end portions thereof in the widthwise direction by forming a tire radial direction outermost belt layer by spirally winding the strip member with a winding pitch smaller than the width of the strip member; and a boundary face between the circumferential belt and the carcass is a smooth curved face by forming a tire radial direction innermost belt layer by spirally winding the strip member such that respective turns of the strip member abut each other in the widthwise direction.

2. The aircraft radial tire of claim 1, wherein in the stepped configuration the width of each step is in a range of 0.2 to 0.6 times as wide as the width of the strip member.

3. The aircraft radial tire of claim 1, wherein the cord has physical characteristics including: tensile strength being 6.3 cN/dtex or more; elongation rate under a load of 0.3 cN/dtex being in a range of 0.2 to 2.0%; elongation rate under a load of 2.1 cN/dtex being in a range of 1.5 to 7.0%; elongation rate under a load of 3.2 cN/dtex being in a range of 2.2 to 9.3%.

4. The aircraft radial tire of claim 1, wherein the cord is formed of aromatic polyamide fibers.

5. The aircraft radial tire of claim 1, wherein a rubber member having a triangular section is provided at the end portions of the belt.

* * * * *